US012469391B2

(12) United States Patent
Kawasaki

(10) Patent No.: US 12,469,391 B2
(45) Date of Patent: Nov. 11, 2025

(54) DRIVING SUPPORT SYSTEM

(71) Applicant: TOYOTA JIDOSHA KABUSHIKI KAISHA, Toyota (JP)

(72) Inventor: Norikazu Kawasaki, Nishinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 18/480,008

(22) Filed: Oct. 3, 2023

(65) Prior Publication Data

US 2024/0161623 A1   May 16, 2024

(30) Foreign Application Priority Data

Nov. 15, 2022  (JP) ................. 2022-182577

(51) Int. Cl.
| | |
|---|---|
| *G08G 1/16* | (2006.01) |
| *B60W 30/09* | (2012.01) |
| *B60W 30/095* | (2012.01) |
| *G08G 1/01* | (2006.01) |

(52) U.S. Cl.
CPC ............ *G08G 1/166* (2013.01); *B60W 30/09* (2013.01); *B60W 30/095* (2013.01); *G08G 1/0112* (2013.01); *G08G 1/0116* (2013.01); *B60W 2540/30* (2013.01)

(58) Field of Classification Search
CPC ...... G08G 1/0112; G08G 1/0116; G08G 1/16; G08G 1/166; B60W 30/09; B60W 30/095; B60W 30/0956; B60W 30/18159; B60W 2540/30; B60W 2556/45; B60W 50/14

USPC ......................................... 701/301
See application file for complete search history.

(56) References Cited

U.S. PATENT DOCUMENTS

| | | | |
|---|---|---|---|
| 2009/0174573 A1* | 7/2009 | Smith ................. | G08G 1/0962 340/905 |
| 2011/0128139 A1 | 6/2011 | Tauchi et al. | |
| 2016/0328968 A1* | 11/2016 | Elsheemy ................ | B60T 7/18 |
| 2019/0283764 A1 | 9/2019 | Morimoto et al. | |
| 2019/0355245 A1* | 11/2019 | Gigengack ............ | B60W 40/04 |
| 2020/0111350 A1* | 4/2020 | Julian ..................... | G08G 1/04 |
| 2021/0026360 A1* | 1/2021 | Luo ....................... | G08G 1/0125 |
| 2021/0326586 A1* | 10/2021 | Sorci ....................... | G16H 15/00 |
| 2021/0380115 A1* | 12/2021 | Alpert ...................... | G06N 3/02 |
| 2022/0111867 A1* | 4/2022 | Trask .................... | B60W 40/09 |

(Continued)

FOREIGN PATENT DOCUMENTS

| | | | |
|---|---|---|---|
| JP | 2002329291 A | * | 11/2002 |
| JP | 2003077093 A | * | 3/2003 |

(Continued)

*Primary Examiner* — Atul Trivedi
(74) *Attorney, Agent, or Firm* — SoraIP, Inc.

(57) ABSTRACT

The driving support device includes a control unit that acquires target information indicating a target on a road intersecting the intersection from the roadside device, determines a possibility of collision between the target and the vehicle at the intersection based on the target information and the own vehicle information indicating the state of the vehicle, determines to perform driving assistance to the driver of the vehicle based on the result of the determination, acquires vehicle operation information indicating a driving operation by the driver with respect to the driving assistance, and diagnoses a driving tendency of the driver based on the vehicle operation information.

8 Claims, 5 Drawing Sheets

(56) References Cited

U.S. PATENT DOCUMENTS

| | | | |
|---|---|---|---|
| 2022/0152826 A1* | 5/2022 | Danielczuk | B25J 9/1697 |
| 2022/0379917 A1* | 12/2022 | Henke | B60W 60/0027 |
| 2023/0037767 A1* | 2/2023 | Yang | G08G 1/167 |
| 2023/0138163 A1* | 5/2023 | Sivanesan | G08G 1/162 |
| | | | 701/301 |
| 2024/0059285 A1* | 2/2024 | Ng | B60W 50/14 |
| 2024/0182038 A1* | 6/2024 | Kilaru | G08G 1/096708 |
| 2024/0208537 A1* | 6/2024 | Cain, Jr. | B60W 50/14 |
| 2024/0317304 A1* | 9/2024 | Oba | B60W 50/0097 |
| 2024/0326863 A1* | 10/2024 | Perez Barrera | B60W 60/0017 |
| 2024/0339033 A1* | 10/2024 | Chamberlin | G08G 1/166 |
| 2024/0416898 A1* | 12/2024 | Perez Barrera | B60W 60/0015 |
| 2025/0002032 A1* | 1/2025 | Kentley-Klay | G06F 18/2413 |
| 2025/0002046 A1* | 1/2025 | Kentley-Klay | B60W 30/09 |
| 2025/0148912 A1* | 5/2025 | Jacobson | G01S 17/931 |

FOREIGN PATENT DOCUMENTS

| | | | | |
|---|---|---|---|---|
| JP | 2005032027 A * | 2/2005 | | |
| JP | 2011-034430 A | 2/2011 | | |
| JP | 2011-113385 A | 6/2011 | | |
| JP | 5359665 B2 | 12/2013 | | |
| JP | 2018-106240 A | 7/2018 | | |
| KR | 20240006532 A * | 1/2024 | | B60W 40/09 |
| WO | WO-2022231721 A1 * | 11/2022 | | B60W 40/09 |

\* cited by examiner

DRIVING SUPPORT SYSTEM

CROSS-REFERENCE TO RELATED APPLICATION

This application claims priority to Japanese Patent Application No. 2022-182577 filed on Nov. 15, 2022, incorporated herein by reference in its entirety.

BACKGROUND

1. Technical Field

The present disclosure relates to a driving support device.

2. Description of Related Art

Conventionally, a technique for diagnosing a driving tendency of a driver is known. For example, Japanese Patent No. 5359665 (JP 5359665 B) discloses a driving support device that diagnoses a driving characteristic representing a tendency of a driving operation when a vehicle is traveling, and notifies advice for improving the habit.

SUMMARY

Advice based only on a result of a driving operation may be inappropriate advice because the relationship with another target (vehicle or pedestrian, etc.) that exists during traveling is not known. For this reason, it is conceivable to detect the other target using an in-vehicle sensor, determine the possibility of collision with the other target, and provide driving support. However, when the other target suddenly appears at an intersection with poor visibility or the like, there is a possibility that the driving operation may be erroneous advice because there is little action that the driver can take to prevent the collision in the first place, for example. As described above, there is room for improvement in the technique for diagnosing the driving tendency.

An object of the present disclosure, made in view of such circumstances, is to improve the technique for diagnosing the driving tendency.

A driving support device according to an embodiment of the present disclosure includes a control unit that sequentially executes the following processes including: acquiring target information indicating a target on a road intersecting an intersection from a roadside device; making determination of a possibility of a collision between the target and a vehicle at the intersection based on the target information and own vehicle information indicating a state of the vehicle; deciding to perform driving support to a driver of the vehicle, based on a result of the determination; acquiring vehicle operation information indicating a driving operation by the driver with respect to the driving support; and diagnosing a driving tendency of the driver based on the vehicle operation information.

According to the embodiment of the present disclosure, it is possible to improve the technique for diagnosing the driving tendency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
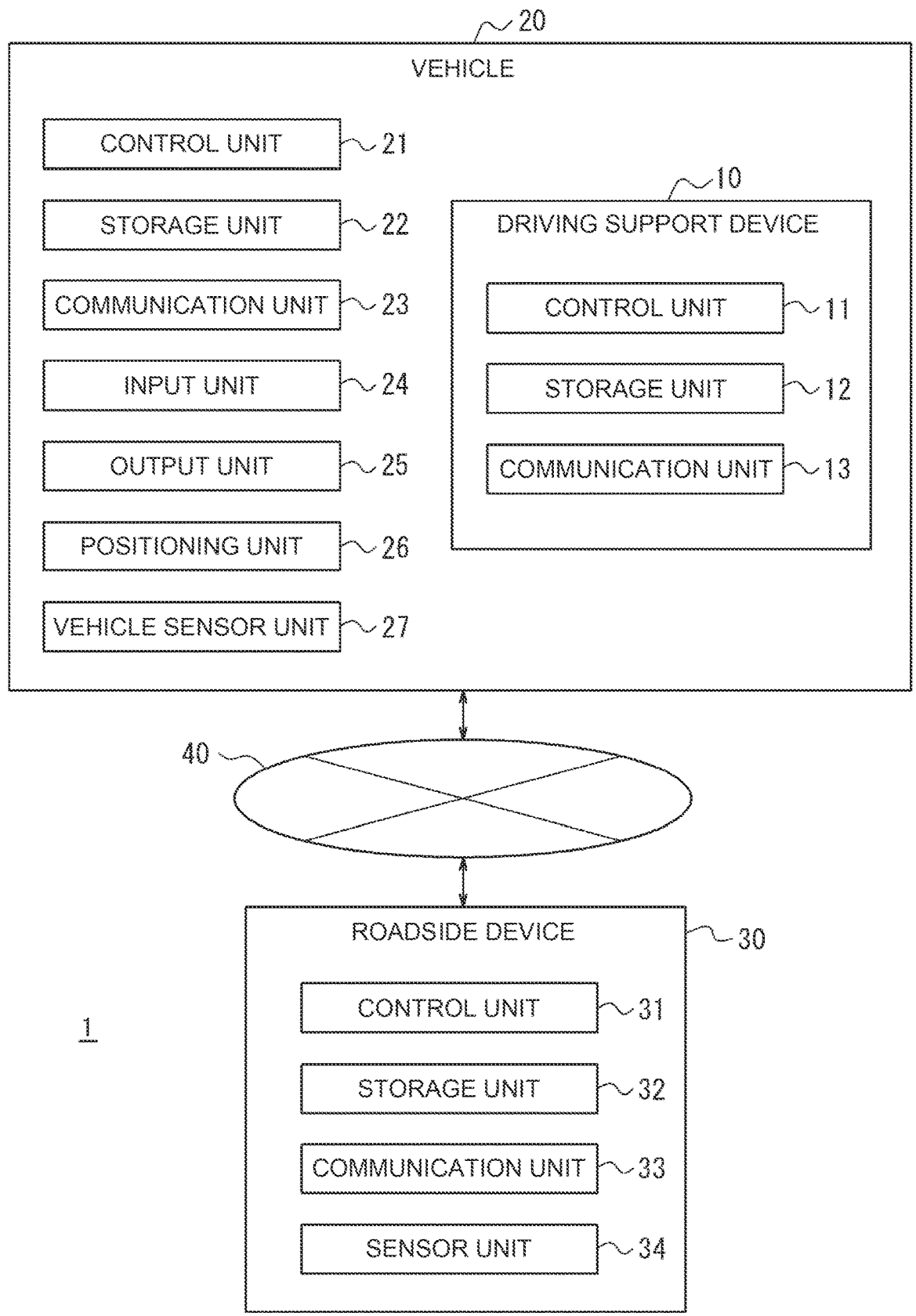
FIG. 1 is a block diagram illustrating a schematic configuration of a system according to a first embodiment.

Hereinafter, a first embodiment of the present disclosure will be described. First, an outline of a system 1 according to an embodiment of the present disclosure will be described with reference to FIG. 1. The system 1 includes a driving support device 10, a vehicle 20, and a roadside device 30. The devices are communicatively connected to each other via a network 40 including, for example, the Internet.

As illustrated in FIG. 1, the driving support device 10 is mounted on a vehicle 20. The present disclosure is not limited thereto, and at least a part of the driving support device 10 may be configured by an external server apparatus. The function of the driving support device 10 may be realized by another device such as an Electronic Control Unit (ECU) of the vehicle 20 or a navigational device mounted on the vehicle 20.

Vehicle 20 is any type of vehicle, such as a gasoline-powered vehicle, a diesel-powered vehicle, a hydrogen-powered vehicle, hybrid electric vehicle (HEV), plug-in hybrid electric vehicle (PHEV), battery electric vehicle (BEV), or fuel cell electric vehicle (FCEV). In the present embodiment, the vehicle 20 is driven by a driver, but may be autonomous vehicle (AV) or may be automated. The level of automation is, for example, any of level 1 to level 5 in the level division of Society of Automotive Engineers (SAE).

The roadside device 30 is provided within a predetermined range from the intersection I, and is capable of detecting a state of a road intersecting the intersection I. The roadside device 30 can transmit information indicating the detection result to the driving support device 10.

Network 40 may include narrow-area communications, the Internet, at least one wide area network (WAN), at least one metropolitan area network (MAN), or a combination thereof. The "narrow-area communication" is one in which the vehicles 20 or the vehicle 20 and the roadside device 30 perform direct communication, such as intelligent transport systems (ITS) Connect. The network 40 may include at least one wireless network, at least one optical network, or a combination thereof. The wireless network is, for example, an ad hoc network, a cellular network, a wireless local area network (LAN), a satellite communication network, or a terrestrial microwave network.

First, the outline of the present embodiment will be described, and the details will be described later. The driving support device 10 acquires the target information indicating the target on the road intersecting the intersection I from the roadside device 30, and determines the possibility of collision between the target M and the vehicle 20 at the intersection I on the basis of the target information and the host vehicle information indicating the state of the vehicle 20. The driving support device 10 performs driving assistance such as notifying the driver of the vehicle 20 that there is a possibility of collision with the intersecting target M based on the result of the determination. Further, vehicle operation information indicating a driver's driving operation with respect to the driving assistance is acquired, and the driver's driving tendency is diagnosed based on the vehicle operation information.

The driving support device 10 communicates with the roadside device 30, receives an image captured and generated by the roadside device 30, and acquires the image as target information. The driving support device 10 detects a target indicated by the image by an arbitrary image analysis technique. The target includes a moving object such as a pedestrian, a bicycle, or another vehicle.

The intersection I includes an area where at least two roads intersect, such as a T-shaped road, a three-way road, and a multi-way road, in addition to the cross road. As described below, the driving support device 10 determines the possibility of collision between the vehicle 20 and the target based on the target information. When it is determined that there is a possibility of a collision, the driving support device 10 decides to perform driving assistance such as notification to the driver of the vehicle 20. The diagnosis of the driver's driving tendency includes a diagnosis of at least one of the slow running speed of the vehicle 20 after the driving assistance, the deceleration, and the time until the response to the driving assistance, as described below.

According to the present embodiment, the driving support device 10 can accurately diagnose the driving tendency when the driver operates the vehicle 20 in accordance with the driving assistance. On the basis of the result of the diagnosis, it is possible to appropriately advise the driver as to which vehicle operation parameters are improved by the driving support device 10 to achieve safe driving. Thus, it is possible to improve the technique of diagnosing the driving tendency Next, each configuration of the system 1 will be described in detail.

Driving Support Device 10

The driving support device 10 includes a control unit 11, a storage unit 12, and a communication unit 13.

The control unit 11 includes at least one processor, at least one dedicated circuit, or a combination thereof. A processor may be a general-purpose processor such as central processing unit (CPU) or graphics processing unit (GPU) or a special-purpose processor specialized for a particular process. Dedicated circuitry is, for example, field-programmable gate array (FPGA) or application specific integrated circuit (ASIC). The control unit 11 may include an ECU. The control unit 11 executes processing related to the operation of the driving support device 10 while controlling each unit of the driving support device 10.

The storage unit 12 includes at least one semiconductor memory, at least one magnetic memory, at least one optical memory, or a combination of at least two of these. Semiconductor memories are, for example, random access memory (RAM) or read only memory (ROM). RAM is, for example, static random access memory (SRAM) or dynamic random access memory (DRAM). ROM is, for example, electrically erasable programmable read only memory (EEPROM). The storage unit 12 functions as, for example, a main storage device, an auxiliary storage device, or a cache memory. The storage unit 12 stores information used for the operation of the driving support device 10 and information obtained by the operation of the driving support device 10.

For example, the storage unit 12 may store a system program, an application program, a database, map information, and the like. The information stored in the storage unit 12 may be updatable by information acquired from the network 40 via the communication unit 13.

The communication unit 13 includes at least one communication interface. The communication interface is, for example, an interface compatible with a mobile communication standard such as LTE, 4G standard or 5G standard. For example, an in-vehicle communication device such as Data Communication Module (DCM) may function as the communication unit 13. The communication unit 13 receives information used for the operation of the driving support device 10 and transmits information obtained by the operation of the driving support device 10.

The function of the driving support device 10 is realized by executing the control program according to the present embodiment by a processor corresponding to the control unit 11. That is, the functions of the driving support device 10 are realized by software. The control program causes the computer to execute the operation of the driving support device 10, thereby causing the computer to function as the driving support device 10. That is, the computer functions as the driving support device 10 by executing the operation of the driving support device 10 in accordance with the control program.

The program can be stored in a non-transitory computer-readable medium. The non-transitory computer-readable medium in this embodiment is a ROM. Non-limiting examples of the non-transitory computer-readable medium include a magnetic recording device, an optical disk, and a magneto-optical recording medium. Distribution of the program is performed, for example, by selling, transferring, or lending a portable medium such as a digital versatile disc (DVD) or a compact disc read only memory (CD-ROM) storing the program. The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The process may be executed by a so-called application service provider (ASP) type service that realizes a function only by an execution instruction and a result-acquisition, without transferring a program from a server to a computer. The program includes information that is used for processing by electronic computers and equivalent to a program. For example, data that is not a direct command to a computer but has the property of defining the process of the computer corresponds to the "data equivalent to a program".

Some or all of the functions of the driving support device 10 may be realized by a programmable circuit or a dedicated circuit as the control unit 11. That is, some or all of the functions of the driving support device 10 may be realized by hardware.

Vehicle 20

The vehicle 20 includes a control unit 21, a storage unit 22, a communication unit 23, an input unit 24, an output unit 25, a positioning unit 26, and a vehicle sensor unit 27. Each component of the vehicle 20 is communicably connected to each other via, for example, a dedicated line.

The hardware configurations of the control unit 21, the storage unit 22, and the communication unit 23 of the vehicle 20 may be the same as the hardware configurations of the control unit 11, the storage unit 12, and the communication unit 13 of the driving support device 10, respectively. The description here is omitted.

The input unit 24 includes at least one input interface. The input interface is, for example, a physical key, a capacitive key, a pointing device, a touch screen integrated with a display, or a microphone. The input unit 24 receives an operation of inputting data used for the operation of the vehicle 20. Instead of being provided in the vehicle 20, the input unit 24 may be connected to the vehicle 20 as an external input device. As the connecting method, any method such as Universal Serial Bus (USB), High-Definition Multimedia Interface (HDMI) (registered trademark), or Bluetooth (registered trademark) can be used.

The output unit 25 includes at least one output interface. The output interface is, for example, a display or a speaker. Displays are, for example, liquid crystal display (LCD) or organic electro luminescence (EL) displays. The output unit 25 outputs data obtained by the operation of the vehicle 20. The output unit 25 may be connected to the vehicle 20 as an external output device instead of being provided in the vehicle 20. As a connection method, for example, any method such as USB, HDMI (registered trademark), or Bluetooth (registered trademark) can be used.

The positioning unit 26 includes one or more devices that acquire position information of the vehicle 20. Specifically, the positioning unit 26 includes, for example, a receiver corresponding to GPS, but is not limited thereto, and may include a receiver corresponding to any satellite-based positioning system. The positioning unit 26 outputs position information indicating the position of the vehicle 20 to the control unit 21.

The vehicle sensor unit 27 includes one or more sensors that detect information about the operation of the vehicle 20 or the surrounding environment. The vehicle sensor unit 27 may include any sensor such as a speed sensor, an acceleration sensor, a steering angle sensor, an azimuth sensor, and an outside camera or an inside camera as an image sensor. The vehicle sensor unit 27 outputs the detected information to the control unit 21 as the own-vehicle information. For example, the vehicle sensor unit 27 outputs, to the control unit 21, the speed, acceleration, azimuth angle of the vehicle 20, an image captured by an outside camera or an inside camera of the vehicle, and the like as own-vehicle information indicating the state of the vehicle 20.

Roadside Device 30

The roadside device 30 includes a control unit 31, a storage unit 32, a communication unit 33, and a sensor unit 34.

The hardware configurations of the control unit 31, the storage unit 32, and the communication unit 33 of the roadside device 30 may be the same as the hardware configurations of the control unit 11, the storage unit 12, and the communication unit 13 of the driving support device 10, respectively. The description here is omitted.

The sensor unit 34 is capable of detecting a situation in a predetermined range from the intersection I, including a road intersecting the intersection I. The sensor unit 34 includes, for example, a camera, a millimeter-wave radar, and a Light Detection And Ranging (LiDAR). The sensor unit 34 may be a visible light camera or an infrared camera. The sensor unit 34 outputs information indicating the detection result to the control unit 31. The information indicating the detection result includes, for example, the presence or absence of a target in a predetermined range from the intersection I, the position, the speed, or the orientation of the target, and the like. In the present embodiment, the sensor unit 34 outputs, to the control unit 31, an image generated by capturing a situation in a predetermined range from the intersection I.

Referring to FIG. 2 to FIG. 4B, an operation of the control unit 11 of the driving support device 10 according to the present embodiment will be described. In the following, the driving support device 10 transmits and receives information to and from each apparatus via the communication unit 13 and the network 40. The driving support device 10 constantly or periodically acquires, from the vehicle 20, own-vehicle information indicating the position, speed, acceleration, angular velocity, steering angle, and the like of the vehicle 20 detected by the positioning unit 26 of the vehicle 20 and the vehicle sensor unit 27.

Figure 2:
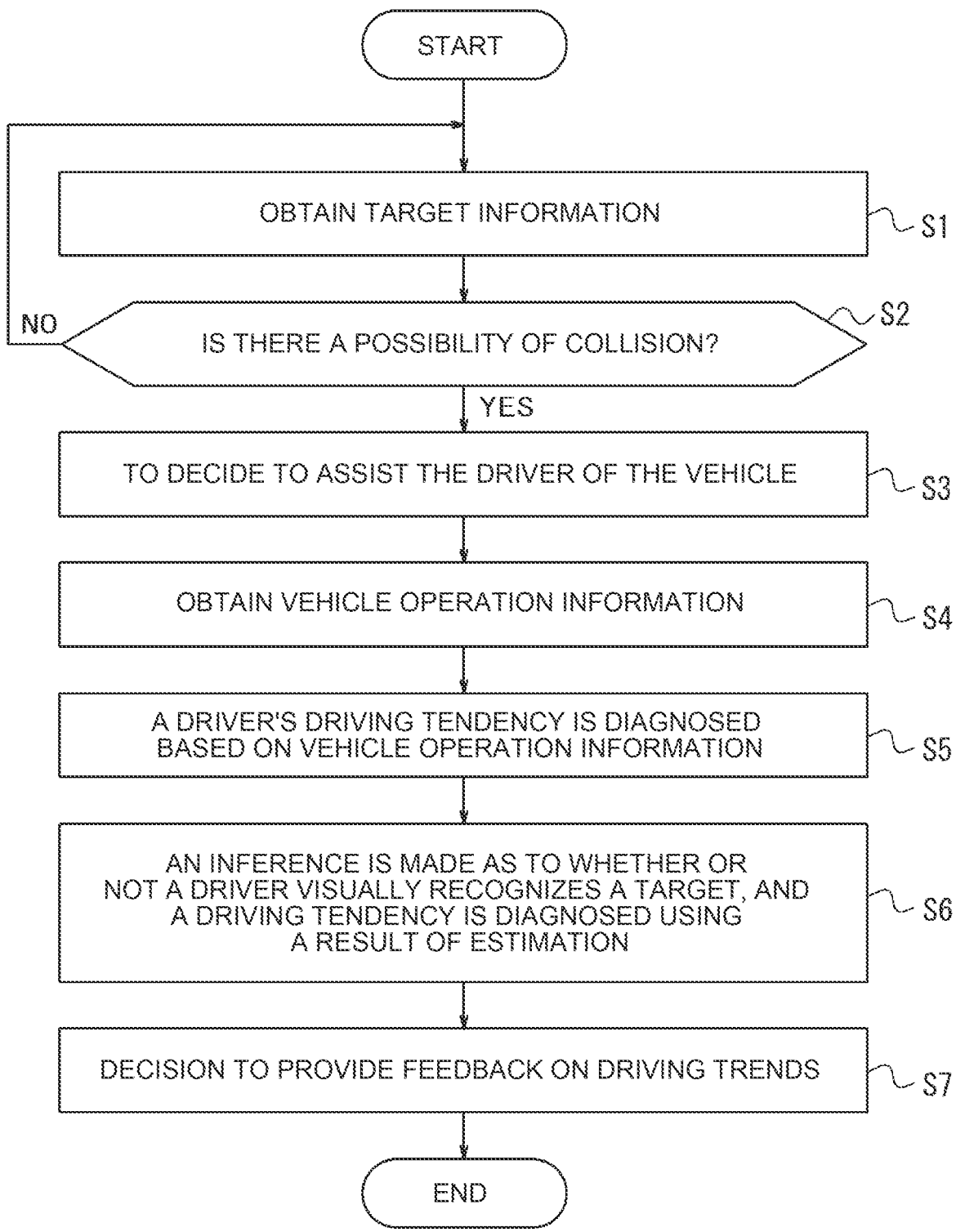
FIG. 2 is a flowchart illustrating an operation of the driving support device according to the first embodiment.
Figure 3:
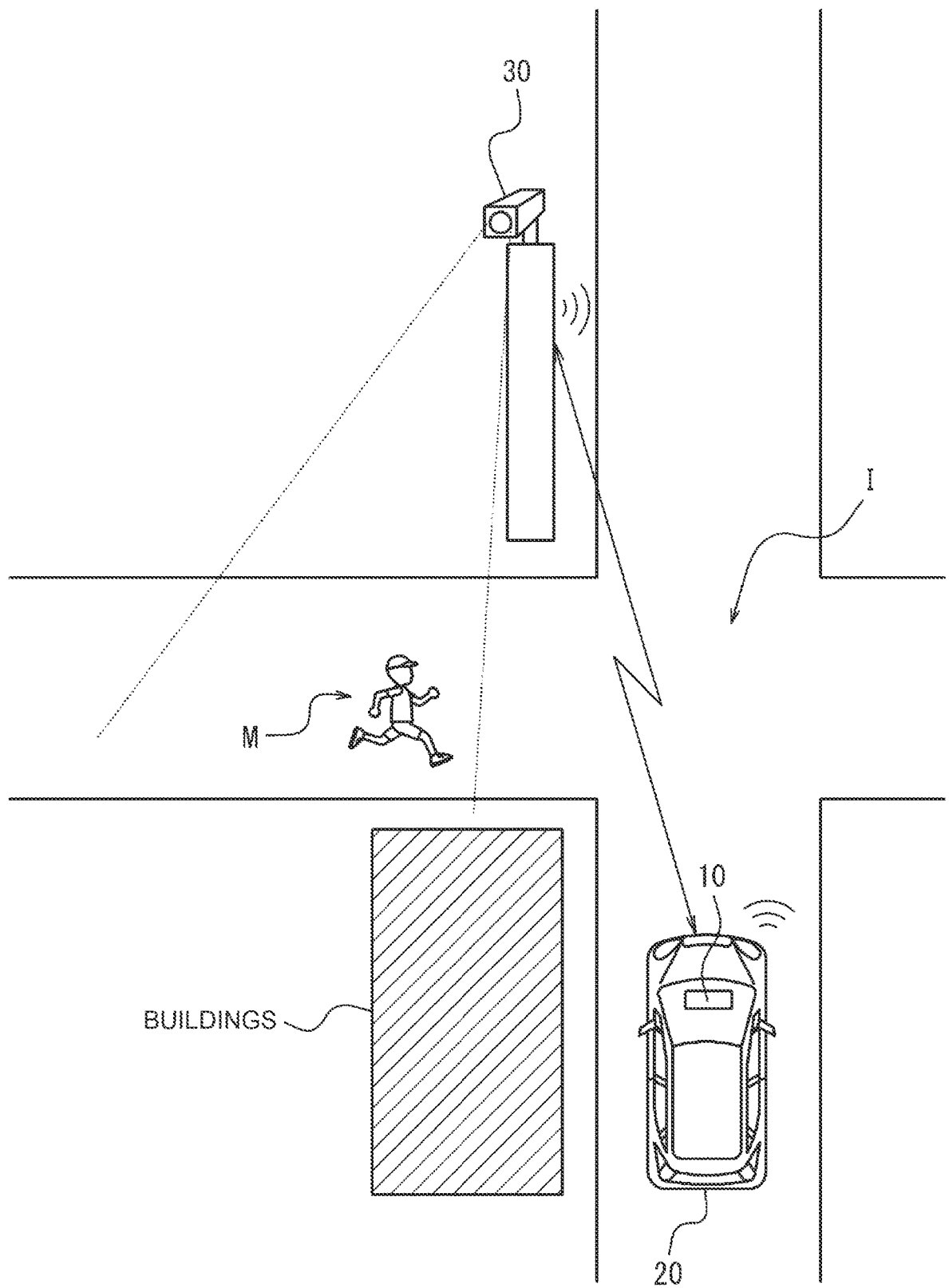
FIG. 3 is a diagram for explaining an example of a situation in which target information according to the first embodiment is acquired.

In S1 of FIG. 2, the control unit 11 of the driving support device 10 acquires target information. Any method may be employed for acquiring the target information. For example, when it is determined that the vehicle 20 is within the predetermined range from the roadside device 30 based on the position information of the vehicle 20, the control unit 31 of the roadside device 30 transmits information indicating the detection result to the driving support device 10. The control unit 11 of the driving support device 10 may acquire the information by receiving the information as target information. In the present embodiment, the control unit 11 acquires the target information by receiving the image transmitted from the roadside device 30. In the present embodiment, as illustrated in FIG. 3, the vehicle 20 and the person serving as the target M are respectively directed toward the intersection I, and the target M is hidden in the building from the vehicle 20 and is difficult to see. The roadside device 30 provided on the road intersecting the intersection I photographs the target M on the road and transmits the image to the driving support device 10. The control unit 11 acquires the image as target information indicating the target M.

In S2, the control unit 11 determines the possibility of the collision between the target M and the vehicle 20 at the intersection I intersecting the road, based on the target information. When it is determined that there is a collision possibility (S2: YES), the process of the control unit 11 proceeds to S3, and when it is determined that there is no collision possibility (S2: NO), the process of the control unit 11 returns to the beginning.

Any technique may be employed to determine the likelihood of collision. For example, the control unit 11 analyzes an image as target information by an arbitrary image analysis technique, acquires two or more of a position, a velocity, an azimuth, and an acceleration of the target M indicated by the image, and calculates a first time Ta that is an expected arrival time of the target M up to the intersection I. The control unit 11 may calculate the first time Ta assuming that the position, the velocity, the azimuth, or the acceleration of the target M is constant. The control unit 11 may calculate the first time Ta based on the position, the velocity, the azimuth, or the acceleration of the target M included in the information indicating the detection result. The control unit 11 acquires two or more of the position, the velocity, the azimuth, and the acceleration of the vehicle 20 indicated by the host vehicle information, and also calculates a second time Tb that is an expected arrival time of the vehicle 20 up to the intersection I for the vehicle 20. The control unit 11 may calculate a first value TG that is a difference between the first time Ta and the second time Tb, determine that there is a possibility of collision when the first value TG is less than the predetermined value, and determine that there is no possibility of collision when the first value TG is greater than or equal to the predetermined value.

In S3, the control unit 11 decides to perform driving assistance to the driver of the vehicle. For example, the control unit 11 may calculate a second value TTC, which is a value obtained by subtracting the present time from the second time Tb, and may determine to perform driving assistance when the second value TTC is less than a predetermined value required for collision-avoidance. When the second value TTC is equal to or greater than a predetermined value required for collision-avoidance, the control unit 11 may determine not to perform the driving support. The predetermined value required for collision avoidance may be freely set. In this way, the control unit 11 decides to provide the driver of the vehicle 20 with the driving assistance based on the result of the determination of the possibility of collision.

Driving assistance specifically includes giving a notification to the driver to warn that there is a possibility of a collision. Any method may be adopted for the notification method. For example, the control unit 11 generates notification information indicating the notification, and outputs the notification information to the vehicle 20. The control unit 21 of the vehicle 20 acquires the notification information and notifies the driver of voice or the like via the output unit 25. The notification is not limited to a voice, and may be, for example, vibration applied to a steering wheel, a seat, or the like of the vehicle 20.

In S4, the control unit 11 acquires vehicle operation information indicating an operation of the driver with respect to the driving assistance. Any method may be employed for acquiring the vehicle operation information. In the present embodiment, the control unit 11 acquires, as the vehicle operation information, an operation performed by the driver after the notification as the driving assistance is performed from the own vehicle information acquired from the vehicle 20.

In S5, the control unit 11 diagnoses the driver's driving tendency based on the vehicle-operating data. Any method may be employed for the diagnosis of the driving tendency. In the present embodiment, the control unit 11 performs diagnosis on at least one of the slow running speed of the vehicle 20, the deceleration, and the time until the response to the driving support as the driving tendency. In the following, the time until the reaction to the driving assistance is also referred to as a reaction time.

Figure 4A:
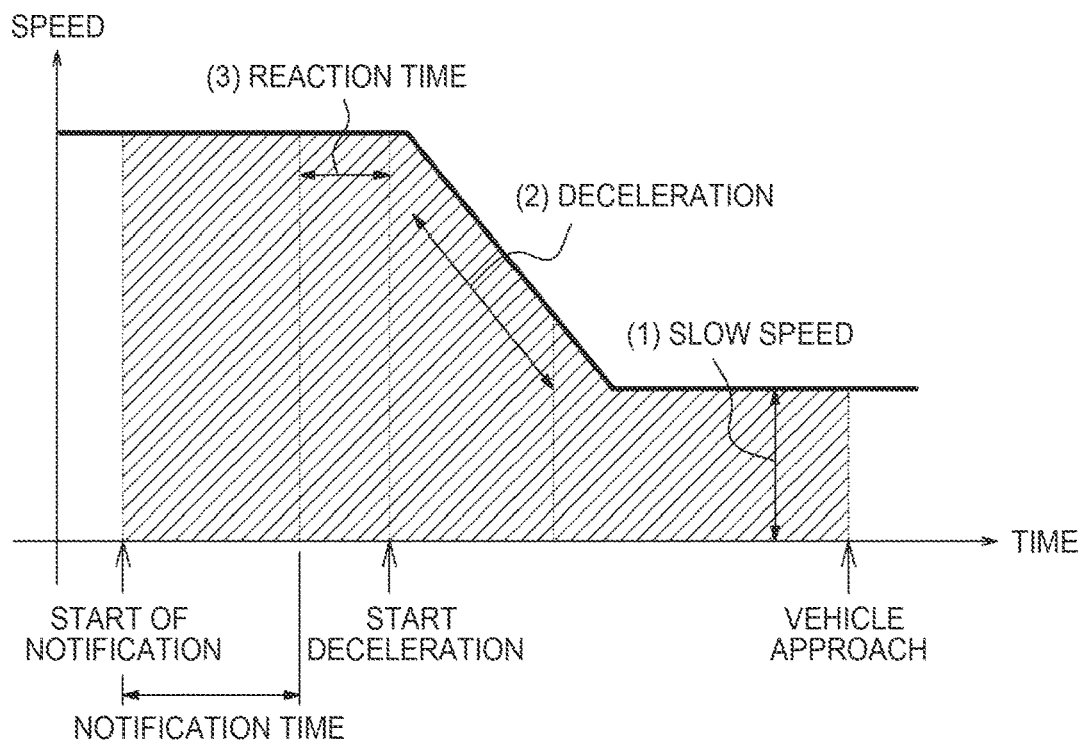
FIG. 4A is a diagram illustrating an operation of a vehicle by a driver.

FIG. 4A is a diagram illustrating the driving operation of the vehicle 20 by the driver after the notification as the driving assistance indicated by the vehicle operation information is performed, with the horizontal axis being a time and the vertical axis being a speed. The hatched portion in the graph represents the distance of the vehicle 20 to the intersection I as a result of integrating the speed in time. In FIG. 4A, three types of operations are shown, namely, a slow-running speed shown in (1), a slow-running speed shown in (2), and a response time shown in (3). More specifically, the response time is the time from the completion of the notification until the driver starts the deceleration, as shown in FIG. 4A.

The control unit 11 may compare the slow running speed, the deceleration speed, and the reaction time with predetermined values set in advance for each of them to diagnose the driving tendency. The predetermined value for the slow speed may be set based on the road traffic law. For example, when the reaction time is less than the predetermined value and the slow running speed is equal to or greater than the predetermined value or the deceleration is less than the predetermined value, the control unit 11 may diagnose that the driving tendency is that the reaction is fast but the momentum of depressing the brake is insufficient. For example, when the slow running speed is less than the predetermined value and the deceleration is also equal to or greater than the predetermined value, and the reaction time is equal to or greater than the predetermined value, the control unit 11 may diagnose that the momentum of depressing the brake as the driving tendency is sufficient but the reaction after the notification takes time. For example, when the reaction time is less than the predetermined value, the slow running speed is less than the predetermined value, and the deceleration is greater than or equal to the predetermined value, the control unit 11 may diagnose that the driving tendency is a safe driving tendency. For example, when the slow running speed is less than the predetermined value, the control unit 11 may diagnose that the driving is safe regardless of the deceleration and the reaction time.

Figure 4B:
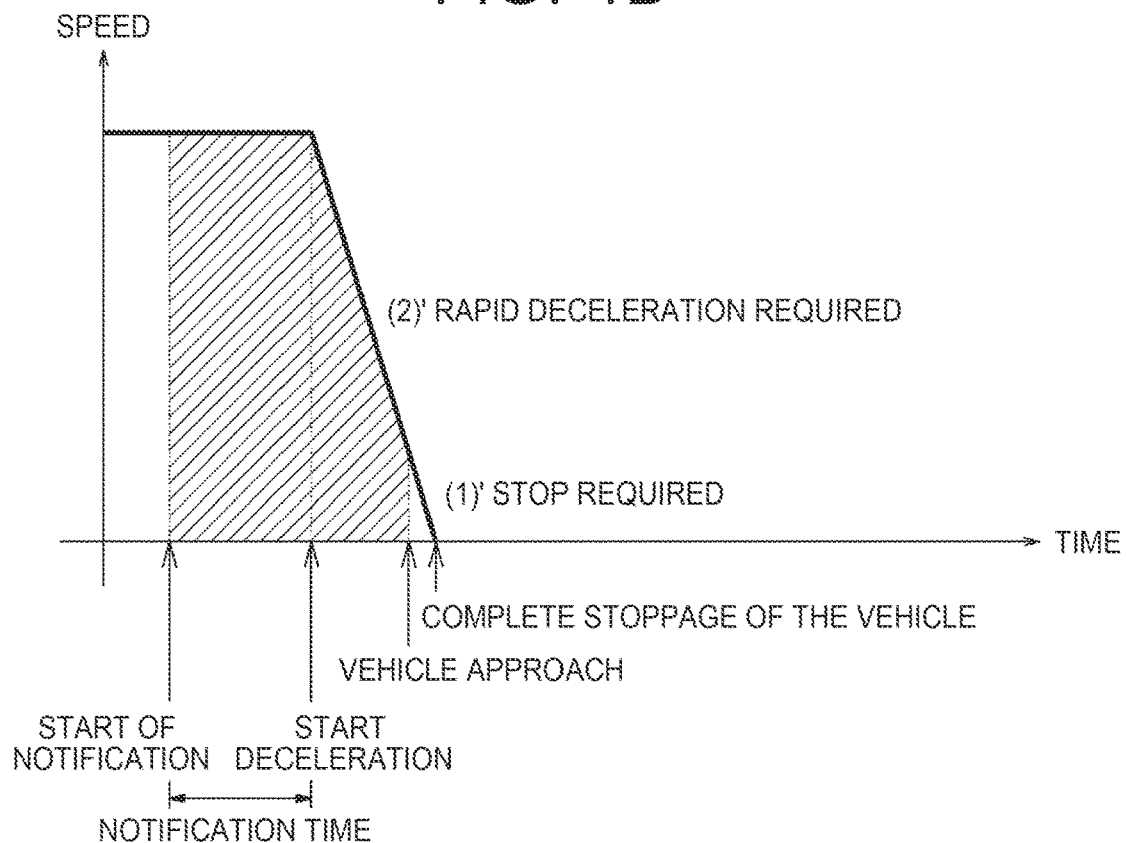
FIG. 4B is a diagram illustrating an operation of a vehicle by a driver.

FIG. 4B illustrates an example of a driver's driving operation according to a notification performed after a target is detected by a vehicle sensor unit 27, such as a camera, mounted on the vehicle 20, instead of the notification based on the target information acquired from the roadside device 30. As compared with FIG. 4A, it can be seen that, in FIG. 4B of the drawing, the distance from the vehicle 20 to the intersection I is short, and there is almost no time from the completion of the notification until the deceleration of the vehicle 20 is started. In FIG. 4B, as shown in (2)', the deceleration has a steep slope, and as shown in (1)', it can be seen that the vehicle 20 does not move at the slow speed, and the vehicle 20 is decelerating suddenly until it is completely stopped. In this way, it can be seen from the graph in FIG. 4B that the driver had slowed down until the driver stopped by stepping on the sudden braking. As described above, the driving operation after the notification based on the target information acquired from the roadside device 30 shown in FIG. 4A includes a plurality of pieces of information used for the diagnosis of the driving tendency, whereas after the sensor or the like of the vehicle 20 detects the target and performs the notification, the driving operation that the driver can perform is limited to avoid a collision, and it can be seen that there is little information used for the diagnosis of the driving tendency. When the detection of the target is delayed and the notification is delayed as shown in FIG. 4B, the control unit 11 may terminate the process without diagnosing the driving tendency. As a result, it is possible to prevent an erroneous diagnosis of the driving tendency.

In S6, the control unit 11 estimates whether or not the driver visually recognizes the target on the basis of the vehicle operation information, and diagnoses the driving tendency using the estimation result. Any method may be employed for the estimation of whether or not the image is visually recognized. For example, the control unit 11 acquires and analyzes an image captured by a camera as the vehicle sensor unit 27 mounted on the vehicle 20, and specifies a time at which a target at the intersection I is detected from the image. When the driver has started deceleration after the time, the control unit 11 may assume that the camera and the driver's visual range are equivalent to each other and that the driver has visually recognized the target. The control unit 11 may estimate that the driver does not visually recognize the target object when the driver starts deceleration before the time.

When it is estimated that the driver visually recognizes the target, the control unit 11 may diagnose that the driver has a tendency to drive by visual observation instead of driving assistance by the driving support device 10 as a driving tendency. When it is estimated that the driver does not visually recognize the target, the control unit 11 may diagnose that the driver has a tendency to drive by relying on the driving support by the driving support device 10 as a driving tendency.

The control unit 11 may store and accumulate the diagnosed driving tendency in the storage unit 12. The present disclosure is not limited to this, and the control unit 11 may transmit information indicating the diagnosed driving tendency to the external device and accumulate the driving tendency in the external device. The control unit 11 may accumulate the driving tendency diagnosed in association with ID identifying the driver. The control unit 11 may acquire the time when the target actually arrives at the intersection I and the time when the vehicle 20 arrives by an arbitrary method, calculate a time difference between the times, and further store the time difference in the storage unit 12. The control unit 11 may learn the driving tendency of the driver by an arbitrary machine learning method.

In S7, the control unit 11 determines to feed back the driving tendency to the driver based on the diagnosis of the driving tendency. The control unit 11 may determine the content of the feedback based on the history of diagnosis of the past driving tendency stored in the storage unit 12. For example, when the control unit 11 diagnoses that the slow-running speed is not sufficiently reduced as the driving tendency, it may decide to give advice to sufficiently reduce the slow-running speed as feedback. For example, when the control unit 11 diagnoses that there is insufficient momentum to depress the brake as the driving tendency, it may decide to give advice to depress the brake vigorously as feedback. For example, when the control unit 11 diagnoses that the response after the notification takes a long time as the driving tendency, it may decide to advance the depression of the brake or give advice to advance the timing of the notification as feedback. For example, the control unit 11 may decide to change the driving support method as feedback when the driver diagnoses as a driving tendency that the driver tends to drive visually rather than by driving support by the driving support device 10. For example, the control unit 11 may decide to perform feedback indicating that the driving is safe when it is diagnosed that the driving tendency is a safe driving tendency.

Any method may be employed for the feedback method. The timing at which the feedback is performed may be freely set. For example, the control unit 11 generates feedback information indicating the content of the feedback, and outputs the feedback information to the vehicle 20. The control unit 21 of the vehicle 20 may acquire the feedback information and notify the driver via the output unit 25. Thereafter, the processing of the control unit 11 ends.

As described above, the driving support device 10 according to the present embodiment includes the control unit 11 that acquires the target information indicating the target M on the road intersecting with the intersection I from the roadside device 30, determines the possibility of collision between the target M and the vehicle 20 at the intersection I based on the target information and the own vehicle information indicating the state of the vehicle 20, determines that the driver of the vehicle 20 is to perform the driving support based on the determination result, acquires the vehicle operation information indicating the driving operation by the driver with respect to the driving support, and diagnoses the driving tendency of the driver based on the vehicle operation information. According to the present embodiment, the recognition range by the driver is widened as compared with the case where the target M is detected only by the in-vehicle sensor based on the target information received from the roadside device 30. Therefore, even at an intersection with poor visibility, it is possible to promptly notify the driver of the presence of the target M and acquire more vehicle operation information after the notification. Therefore, it is easy to diagnose the driving tendency, and as a result, the accuracy of the diagnosis of the driving tendency is improved. By performing feedback based on the diagnosis result, the possibility that the driver performs safe driving is improved. Therefore, it is possible to improve the technique of diagnosing the driving tendency.

As described above, in the driving support device 10 according to the present embodiment, the roadside device 30 includes the sensor unit 34 that detects the state of the road, and the control unit 11 acquires information indicating the detection result by the sensor unit 34 as target information. According to the present embodiment, it is possible to detect the presence of the target M and to notify the driver of the presence of the target M earlier, and consequently, the accuracy of the diagnosis of the driving tendency is improved. Therefore, it is possible to improve the technique of diagnosing the driving tendency.

As described above, in the driving support device 10 according to the present embodiment, the control unit 11 performs diagnosis on at least one of the slow running speed of the vehicle 20, the deceleration speed, and the time until the response to the driving support as the driving tendency. According to the present embodiment, the driver's driving tendency can be diagnosed for a plurality of items, and the accuracy of the diagnosis is improved. Therefore, it is possible to improve the technique of diagnosing the driving tendency.

As described above, in the driving support device 10 according to the present embodiment, the control unit 11 performs estimation as to whether or not the driver visually recognizes the target M on the basis of the vehicle operation information, and diagnoses the driving tendency using the result of the estimation. According to the present embodiment, it is possible to diagnose, as a driving tendency, that the driver is highly likely to perform the driving operation for the first time after visual inspection without depending on the driving support of the driving support device 10. Therefore, since the accuracy of the diagnosis of the driving tendency is improved, it is possible to improve the technique for performing the diagnosis of the driving tendency.

Second Embodiment

Hereinafter, a second embodiment of the present disclosure will be described. In the present embodiment, the roadside device 30 is a traffic light provided at the intersection I. The traffic light as the roadside device 30 transmits traffic light information indicating the display content of the traffic light to the driving support device 10. The traffic light information includes a sign such as a color or a figure indicated by the traffic light, a switching time of the sign such as the color or the figure, and the like. The roadside device 30 may transmit the traffic light information to the driving support device 10 when the distance from the vehicle 20 becomes less than the predetermined value. The roadside device 30 may transmit, as the target information, an image obtained by photographing a road within a predetermined range from the intersection I to the driving support device 10.

The control unit 11 acquires the traffic light information and the target information by receiving the traffic light information. The control unit 11 may determine that the vehicle 20 enters the intersection I while the signal indicates the entry stop of the vehicle, when the difference between the time when the signal light indicated by the traffic light is switched to a sign indicating the stop of the vehicle, such as red, and the second time Tb, which is the estimated arrival time of the vehicle 20 to the intersection I, is within a predetermined value. Similarly to the first embodiment, the control unit 11 may further calculate a second value TTC obtained by subtracting the present time from the second time Tb, and when the second value TTC is less than the predetermined value, determine to perform the driving support and determine to perform the driving support.

Even when determining that there is no possibility of collision with the target based on the acquired target information, the control unit 11 may decide to perform driving assistance to the driver of the vehicle 20 based on the traffic light information. The control unit 11 may diagnose the driving tendency after the driving support as in the first embodiment described above. The control unit 11 may estimate whether or not the driver visually recognizes the color of the signal light. Any method may be employed for the estimation of whether or not the image is visually recognized.

As described above, the control unit 11 of the driving support device 10 according to the present embodiment acquires the traffic light information indicating the display content of the traffic light at the intersection I, and decides to perform the driving support to the driver of the vehicle 20 based on the traffic light information. According to the present embodiment, the control unit 11 can also diagnose the driver's driving tendency with respect to the notification when the traffic light indicator is switched. Since the driving tendency with respect to the notification performed in advance can be diagnosed before the vehicle enters the intersection I to be stopped, the driving tendency can be diagnosed by acquiring the vehicle operation information for a longer period of time. Therefore, since the accuracy of the diagnosis of the driving tendency is improved, it is possible to improve the technique for performing the diagnosis of the driving tendency.

Third Embodiment

Hereinafter, a third embodiment of the present disclosure will be described. In the present embodiment, the roadside device 30 is a traffic light provided at the intersection I. As in the second embodiment, the control unit 11 of the driving support device 10 acquires the traffic light information and the target information by receiving the traffic light information and the target information from the traffic light.

On the basis of the traffic light information and the target information, the control unit 11 determines the presence of the straight oncoming vehicle V1 that is an oncoming vehicle that is traveling straight to the intersection I when the traffic light indicator indicated by the traffic light information indicates permission of a signal such as blue and the vehicle 20 is going to turn right at the intersection I. The control unit 11 may determine that the vehicle 20 is about to turn right at the intersection I based on the host vehicle information acquired from the vehicle 20. When there is a straight oncoming vehicle V1, the control unit 11 analyzes an image as target information by any image analysis technique, acquires a plurality of positions, velocities, azimuths, and accelerations of the straight oncoming vehicle V1 as targets, and calculates a first time Ta, which is an expected arrival time to the intersection I, as in the first embodiment. The control unit 11 also calculates a second time Tb, which is an expected arrival time to the intersection I, for the vehicle 20. The control unit 11 may calculate a first value TG that is a difference between the first time Ta and the second time Tb, and determine that there is a possibility of a collision when the first value TG is less than a predetermined value. Similarly to the first embodiment, the control unit 11 calculates a second value TTC obtained by subtracting the present time from the second time Tb, and when the second value TTC is less than a predetermined value required for collision avoidance, determines to perform driving assistance and performs driving assistance.

Figure 5:
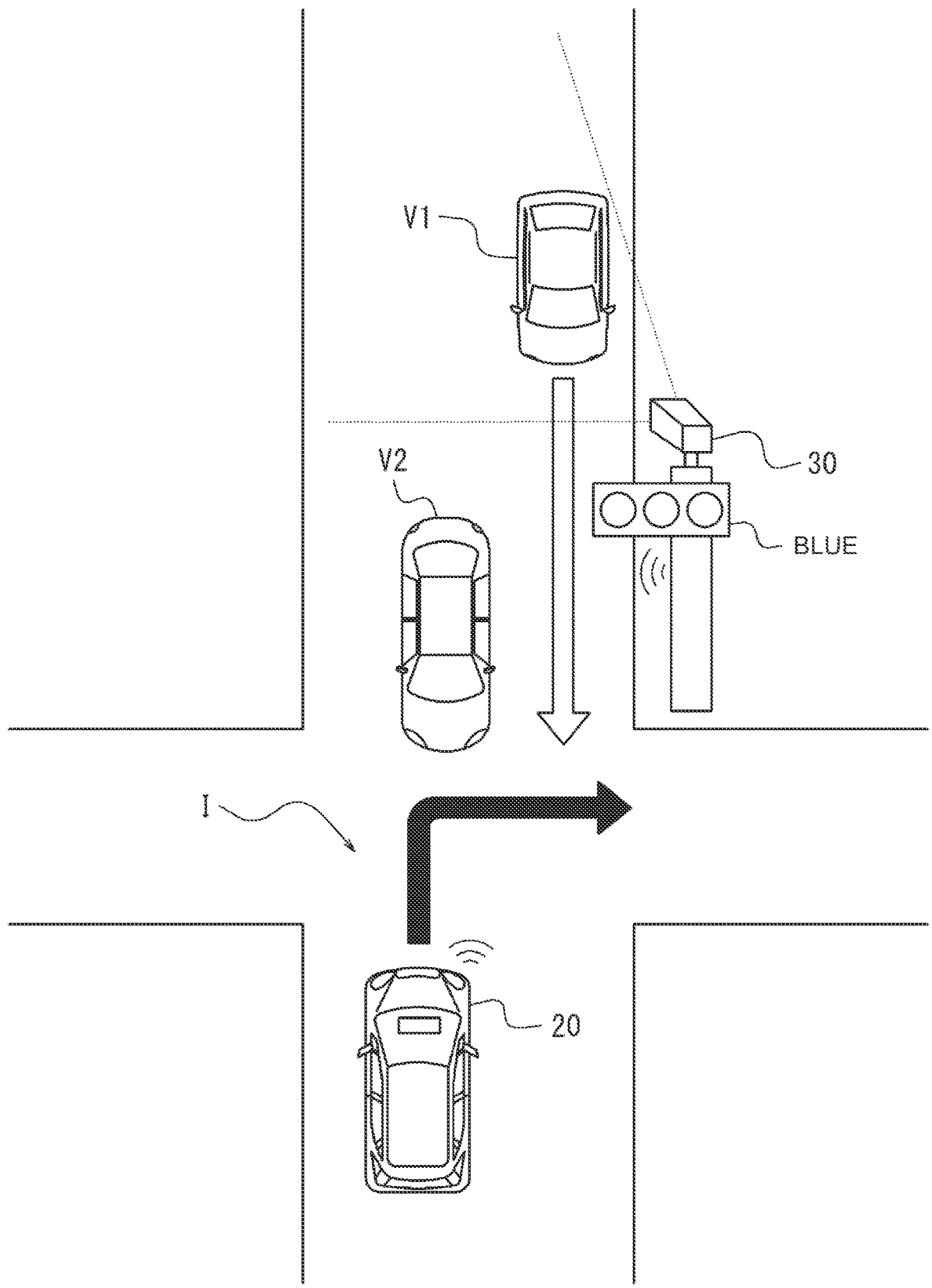
FIG. 5 is a diagram for explaining an example of a situation in which target information according to the second embodiment is acquired.

Referring to FIG. 5, the traffic light as the roadside device 30 is shown in blue, and the vehicle 20 according to the present embodiment tries to turn the intersection I right in the direction of the black arrow. In FIG. 5, it is assumed that a straight oncoming vehicle V1 which is traveling straight in the direction of the white arrow toward the intersection I and an oncoming vehicle V2 which is going to turn left in front of the vehicle 20 are present, and thus the straight oncoming vehicle V1 is difficult to be seen from the vehicle 20 hidden in the oncoming vehicle V2. The roadside device 30 transmits target information obtained by photographing the straight oncoming vehicle V1 and the traffic light information indicating the blue color of the traffic light to the driving support device 10. The control unit 11 determines the possibility of collision between the vehicle 20 and the straight oncoming vehicle V1 on the basis of the received target information and the traffic signal information, and notifies the vehicle 20 of the possibility of collision as the driving assistance based on the determination result. Similar to the above-described first embodiment, the control unit 11 may diagnose the driving tendency of the driver after the driving support. The control unit 11 may estimate whether the driver visually displays a traffic light or recognizes the straight oncoming vehicle V1. Any method may be employed for the estimation of whether or not the image is visually recognized.

Without being limited to the above, when the vehicle 20 is trying to turn left at the intersection I, the control unit 11 may determine that the vehicle 20 is likely to collide with the oncoming vehicle V2 by receiving, from the roadside device 30, target information indicating the oncoming vehicle V2 that is trying to turn right as a target. For example, the control unit 11 may analyze images as target information, and determine that the oncoming vehicle V2 is about to turn right based on, for example, a display of a turn signal in the oncoming vehicle V2.

According to the present embodiment, even when the vehicle 20 is going to turn left or right at the intersection I and the oncoming vehicle is heading, it is possible to determine the possibility of collision and to perform the driving support based on the result of the determination. Even when the traffic light indicates permission to proceed, it is possible to diagnose the driving tendency with respect to the notification performed in advance when the oncoming vehicle is present, so that the accuracy of the diagnosis of the driving tendency is improved. Therefore, it is possible to improve the technique of diagnosing the driving tendency.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

What is claimed is:

1. A driving support system comprising a vehicle and a roadside device configured to communicate with the vehicle, wherein:
   the roadside device includes a roadside sensor, a roadside processor, and a roadside communication device, the roadside sensor being configured to detect a condition of a road, the roadside processor being configured to
   acquire target information indicating a target on a road intersecting an intersection based on a detection result by the roadside sensor, and
   transmit the target information to the vehicle via the roadside communication device; and
   the vehicle includes a vehicle sensor, a vehicle processor, and an output device, the vehicle sensor being configured to detect own vehicle information on a state of the vehicle and vehicle operation information indicating a driving operation by a driver, the vehicle processor being configured to
   acquire the target information from the roadside device,
   acquire the own vehicle information from the vehicle sensor,
   give a warning notification to the driver of the vehicle in a case that a possibility of a collision between the target and the vehicle at the intersection is greater than or equal to a predetermined threshold based on the target information and the own vehicle information,
   acquire the vehicle operation information indicating the driving operation that the driver operates after giving the warning notification to the driver, from the vehicle sensor, and
   output, by the output device, information on a driving tendency of the driver based on the acquired vehicle operation information.

2. The driving support system according to claim 1, wherein the vehicle processor is configured to determine the driving tendency, based on at least one of a slow-moving speed of the vehicle, a deceleration of the vehicle, and a time taken to react to the warning notification.

3. The driving support system according to claim 2, wherein the vehicle processor is configured to:
   estimate whether the driver has visually recognized the target, based on the vehicle operation information; and
   determine the driving tendency using the estimated result of whether the driver has visually recognized the target.

4. The driving support system according to claim 2, wherein the time taken to react to the warning notification is a time from a completion of the warning notification until the driver starts the deceleration.

5. The driving support system according to claim 1, wherein the vehicle processor is configured to:
   acquire traffic light information indicating a display content of a traffic light at the intersection; and
   give the warning notification to the driver, based on the traffic light information.

6. The driving support system according to claim 1, wherein the output device is a display or a speaker.

7. The driving support system according to claim 1, wherein the vehicle processor is configured to determine the possibility of the collision between the target and the vehicle at the intersection is greater than or equal to the predetermined threshold.

8. The driving support system according to claim 1, wherein the vehicle processor is configured to give the warning notification by vibration applied to a steering wheel or a seat of the vehicle.

* * * * *